Dec. 8, 1959   L. A. HUGHES   2,915,938
ELECTRONIC COLORIMETER
Filed Feb. 27, 1956

INVENTOR
LEONARD A. HUGHES
BY
Gardner & Zimmerman
ATTORNEYS

United States Patent Office 2,915,938
Patented Dec. 8, 1959

2,915,938

ELECTRONIC COLORIMETER

Leonard A. Hughes, Berkeley, Calif.

Application February 27, 1956, Serial No. 568,043

1 Claim. (Cl. 88—14)

The present invention relates to an electronic colorimeter directed to the field of medicine and particularly adapted to the quantitative chemical and biological analysis of such body fluids as blood, urine and spinal fluid. The invention possesses various other medical aspects and is useful, for example, in the measurement of the capillary pulse and other peripheral vascular determinations not ordinarily visually determinable.

The present invention is possessed of numerous advantageous features and is particularly directed to overcoming certain limitations of conventional instruments of this general type. For medical investigations and analysis of body fluids where only very small samples of fluid are available the present invention employs a very sharp monochromatic light beam in combination with very sensitive light-responsive means producing signals that are amplified and visually indicated. Prior art devices suffer from lack of reproducibility because the fine beams of light required cause erratic response of light-sensitive devices. Additionally, electronic colorimeters commonly are limited by the fact that they require an appreciable warm-up time, draw considerable current, are bulky, and are susceptible to shock.

The instrument of the present invention produces reliably reproducible data with a high degree of accuracy, while at the same time occupying but 2 to 3 percent of the volume and having less than 10 percent of the weight of conventional instruments of this type. Additionally, the present device, by employing only very low power components, is capable of and is in fact preferably battery operated so as to be truly portable and is at the same time instantaneously operable. As contrasted with known electronic colorimeters, the present invention is quite rugged and is very inexpensive both to build and to maintain and operate.

It is an object of the present invention to provide an accurate portable electronic colorimeter.

It is another object of the present invention to provide a simple and inexpensive electronic device for the medical analysis of body fluids.

It is a further object of the present invention to provide an accurate electronic colorimeter of minute size and small weight.

It is yet another object of the present invention to provide an electronic colorimeter that is instantaneously operable upon energization without requiring warm-up time.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

The invention is illustrated in the accompanying drawing wherein.

Considering now the invention in some detail, it is again noted that the colorimeter thereof is particularly adapted to medical analysis, and in the determination, for example, of hemoglobin, as in other uses of the device, the light transmissivity of a standard size sample is measured by employing a monochromatic light beam of a color opposite on the spectrum from the color of the sample to be investigated. In the measurement of hemoglobin a light beam of a color opposite on the color spectrum to red is employed. Wide applicability of the instrument is provided by utilizing a variable light filter whereby the color of the light beam may be set for the type of material to be analyzed. It is further to be noted that the colorimeter is a comparative instrument in that relative readings are obtained so that in operation calibration is made against a standard sample.

Figure 2:
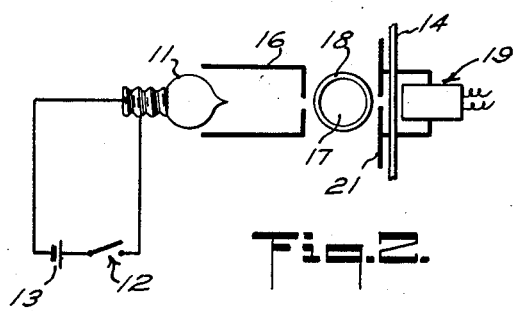
Figure 2 is a schematic illustration of the light system.

The light system as shown in Figure 2 includes a light source 11 which may comprise a miniature bulb having an integral light focusing lens and connected through a switch 12 across a power supply 13 such as a miniature dry cell battery. Obviously, any suitable light source and separate focusing lens could be utilized and advantage lies in employing a low drain bulb to maintain constant the battery voltage, low light emission being compensated for as set out below. An apertured plate 16 is positioned in front of light source 11 and collimates the light into a very fine beam, and directly in front of the apertured plate 16 on the opposite side thereof from the light source 11 is removably disposed a sample 17 to be tested. It is contemplated that the sample shall be composed of a colored solution to be analyzed, such as blood hemoglobin in a suitable reagent, contained within a colorless transparent test tube or solution cell 18, such as a 10 x 75 millimeter test tube. On the opposite side of the sample from the light source 11 is disposed a minute light-sensitive device having a very small light-sensitive crystal and in this case comprising a cadmium sulphide photocell 19. The photocell is surrounded by a light-tight box 21 with a thin slot therein aligned with the collimating slot in the plate 16. A light filter 14 is movably mounted within box 21 between the slot and photocell to divert light in a monochromatic condition to the latter. Particular advantage lies in the use of this photocell or its equivalent for it has a great sensitivity to light with a linear response to very low levels of illumination and with round solution cells very fine light beams are required to penetrate a substantially constant solution cross-section. Additionally, this phototube is quite small, one-quarter inch in diameter by three-eighths inch long with a light-sensitive element only about one by two millimeters, which is highly advantageous with very narrow light beams as herein employed. It will be appreciated that the single stationary replaceable sample may be replaced by a tube carrying a steady flow of fluid which is then continuously or as desired monitored as to color intensity during flow through the instrument. The photocell 19 is adapted to produce electrical signals proportional to incident light and the photocell is connected in an energizing and metering circuit described below.

Operation of the light system is quite simple in that energization of the light source 11 by the battery 12 upon closing of the switch 13 produces light which is collimated in passing through the aperture in the plate 16 into a very narrow beam of light. This light beam passes through a sample 17 wherein the proportion absorbed or transmitted is related to the color intensity of the sample under the above listed conditions. The light transmitted by the sample is then passed through filter 14 in a monochromatic condition and is received by the photocell 19 whereat electrical signals are thereby generated in proportion to incident light intensity.

Figure 3:
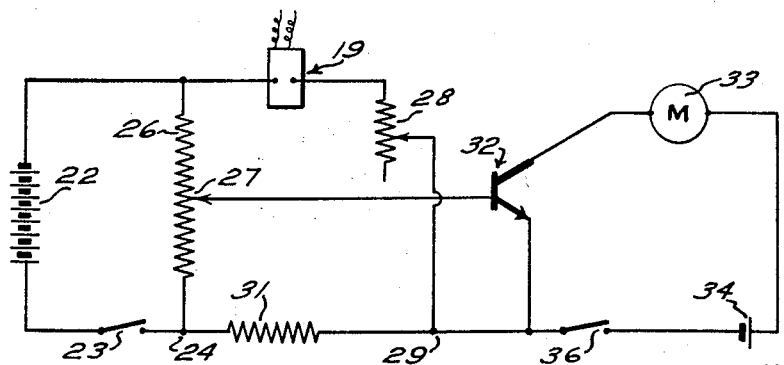
Figure 3 is an electrical diagram of the circuit of the invention.

Measurement of the photocell signals may be accomplished in a variety of ways. However, in order to achieve the objects of the present invention there is employed a transistor circuit as shown in Figure 3. One side of the photocell 19 is connected to the negative side of a power supply 22, such as a dry cell battery, and the positive side of the latter is connected through a switch 23 to a point 24. A resistor 26 is connected from the point 24 back to the same side of the photocell so as to be in electrical parallel with the power supply and switch, and a slide contact 27 is provided on the resistor 26. The other side of the photocell 19 is connected through a variable resistor 28 to a point 29 which is in turn connected to the point 24 through a resistor 31. It will be appreciated that the foregoing circuitry defines a wheatstone bridge with the photocell 19 and variable resistor 28 forming one leg, the resistor 31 an adjacent leg, the resistor 26 from point 24 to contact 27 another leg, and a final leg comprised of resistor 26 from contact 27 to the photocell. Energization of the bridge is accomplished from the battery 22 connected across the two legs formed by resistor 26. As is conventional in bridge circuits, any unbalance between the voltages in the legs thereof, as herein introduced by the photocell 19, results in a voltage difference between corners thereof and in the present circuit a transistor 32 for amplifying any unbalance signal is connected therebetween. The resistor contact 27 is connected to the transistor base while the point 29 is connected to the transistor emitter. A current meter 33 is connected from the transistor collector through a small power supply 34 and a switch 36 to the emitter, and thence to the base through the signal voltage. Through the use of the transistor 32, such as a 2N35, an amplification of about 50 may be maintained so that satisfactory readings may be obtained with a 0-100 micrometer meter.

With regard to operation of the circuit described above, closing of the switch 23 connects the battery 22 across the bridge circuit to energize same and the bridge may be balanced by adjustment of the value of resistor 28. The contact 27 on resistor 26 is adjusted so that a zero signal is produced across the corners of the bridge in the absence of photocell signals. Upon the receipt of signals across the photocell as is produced by closing the light switch 13, a bridge unbalance results with a voltage appearing between contact 27 and point 29 at opposite corners of the bridge. This signal is applied between the base and emitter of the transistor 32. Closing of the meter switch 36 impresses the potential of the battery 34 between the emitter and collector and thus of the signal and battery potential between collector and base whereby an amplified current flows through the meter circuit. The meter reading is thus proportional to the photocell signal which is proportional to the transmissivity of the sample.

By measuring the transmissivity of a standard sample a reference reading is obtained. Subsequent readings may be referenced thereto and in this respect note that a zero adjustment may be made with resistor 27 and/or 28. The greater the transmissivity of the sample interposed between the light source and photocell the larger the reading obtained at the meter 33.

Figure 1:
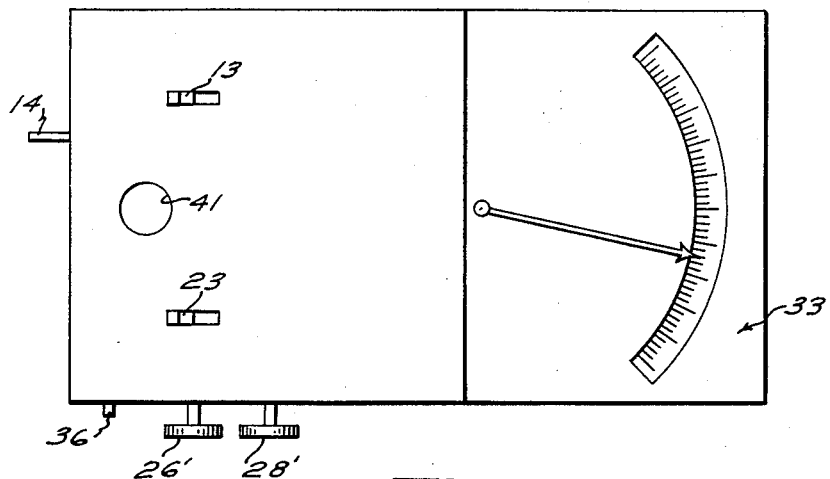
Figure 1 is a plan view of the instrument in full scale.

The colorimeter is shown as a whole in Figure 1 in substantially full scale in the drawing for the meter may be less than six inches long. The switches 13, 23 and 36 are the same as those indicated in Figure 2, while the knobs 26' and 28' operate to move the contacts of resistors 26 and 28 respectively. The filter 14 may be mounted in sliding relation in the housing and extend therefrom so as to be manually movable with exterior visual indicia for indicating the color filter disposed in front of the light source in each filter position. Alternatively the filter may be otherwise movably mounted as on reels or as a segmented wheel. An aperture 41 in the housing accommodates the solution cell 18 which is slid therein preferably into a spring clip for removably maintaining same in position for measurement. Because of the minute size of the light system and electrical circuitry a relatively large measuring instrument may be employed for easy reading while yet maintaining the overall size of the instrument quite small.

What I claim is:

A portable electronic colorimeter comprising in combination with means producing a very thin beam of light for transmission through fluid samples and a light-sensitive device disposed in the path of said transmitted beam of light and having a very narrow width transversely of the beam of light for producing electric signals proportional to incident light, two pairs of resistors connected across the output of said light sensitive device, a transistor connection from the juncture of the resistors of each pair thereof joined one to the base and one to the emitter of said transistor, a battery connected between the junctures of said pairs of resistors, and a second battery and a meter connected between the collector and emitter of said transistor whereby said meter indicates an amplified current proportional to the output of said light sensitive device.

References Cited in the file of this patent

UNITED STATES PATENTS

| | | |
|---|---|---|
| 2,051,320 | States | Aug. 18, 1936 |
| 2,219,928 | Kalmus et al. | Oct. 29, 1940 |
| 2,228,868 | Briebecher | Jan. 14, 1941 |
| 2,265,357 | Demarest | Dec. 9, 1941 |
| 2,282,741 | Parker | May 12, 1942 |
| 2,382,439 | Osborn | Aug. 14, 1945 |
| 2,395,489 | Major | Feb. 26, 1946 |
| 2,477,209 | Rouy | July 26, 1949 |
| 2,483,876 | Boyer | Oct. 4, 1949 |
| 2,666,583 | Whitney | Jan. 19, 1954 |
| 2,688,564 | Forgue | Sept. 7, 1954 |
| 2,736,848 | Rose | Feb. 28, 1956 |
| 2,745,021 | Kurshan | May 8, 1956 |

FOREIGN PATENTS

| | | |
|---|---|---|
| 117,995 | Sweden | Jan. 21, 1947 |